United States Patent
Schwarz et al.

(10) Patent No.: US 10,267,180 B2
(45) Date of Patent: Apr. 23, 2019

(54) GEARED ARCHITECTURE TURBOFAN ENGINE THERMAL MANAGEMENT SYSTEM AND METHOD

(71) Applicant: UNITED TECHNOLOGIES CORPORATION, Hartford, CT (US)

(72) Inventors: Frederick M Schwarz, Glastonbury, CT (US); Simon Pickford, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 317 days.

(21) Appl. No.: 14/776,779

(22) PCT Filed: Mar. 13, 2014

(86) PCT No.: PCT/US2014/025552
§ 371 (c)(1),
(2) Date: Sep. 15, 2015

(87) PCT Pub. No.: WO2014/151356
PCT Pub. Date: Sep. 25, 2014

(65) Prior Publication Data
US 2016/0024965 A1      Jan. 28, 2016

Related U.S. Application Data

(60) Provisional application No. 61/792,395, filed on Mar. 15, 2013.

(51) Int. Cl.
*F01D 25/12* (2006.01)
*F02K 3/06* (2006.01)
(Continued)

(52) U.S. Cl.
CPC ............. *F01D 25/12* (2013.01); *F01D 5/02* (2013.01); *F01D 15/12* (2013.01); *F01D 17/105* (2013.01);
(Continued)

(58) Field of Classification Search
None
See application file for complete search history.

(56) References Cited

U.S. PATENT DOCUMENTS

| 5,269,135 | A | 12/1993 | Vermejan et al. | |
|---|---|---|---|---|
| 7,765,788 | B2 * | 8/2010 | Schwarz | F02C 7/14 60/226.1 |

(Continued)

FOREIGN PATENT DOCUMENTS

| EP | 1630358 A2 | 3/2006 |
|---|---|---|
| EP | 2565396 A2 | 3/2013 |
| WO | 2008045054 A1 | 4/2008 |

OTHER PUBLICATIONS

European Extended Search Report dated Oct. 11, 2016, issued in the corresponding European Patent Application No. 14768480.7.

*Primary Examiner* — Christopher Verdier
*Assistant Examiner* — Jason G Davis
(74) *Attorney, Agent, or Firm* — Bachman & LaPointe, P.C.

(57) ABSTRACT

A method of sizing a heat exchanger for a geared architecture gas turbine engine includes sizing a minimum frontal area of at least one heat exchanger located in communication with a fan bypass airflow such that a ratio of waste heat area to horsepower generation characteristic area is between 1.6 to 8.75.

13 Claims, 5 Drawing Sheets

(51) Int. Cl.
    *F02K 3/115*     (2006.01)
    *F01D 5/02*     (2006.01)
    *F01D 5/12*     (2006.01)
    *F01D 17/10*     (2006.01)
    *F02C 7/14*     (2006.01)
    *F01D 15/12*     (2006.01)

(52) U.S. Cl.
    CPC ............ *F02C 7/14* (2013.01); *F02K 3/06* (2013.01); *F02K 3/115* (2013.01); *F05D 2220/36* (2013.01); *F05D 2230/50* (2013.01); *F05D 2230/60* (2013.01); *F05D 2260/213* (2013.01); *F05D 2260/40311* (2013.01); *F05D 2260/602* (2013.01); *Y02T 50/676* (2013.01)

(56) References Cited

U.S. PATENT DOCUMENTS

| | | | |
|---|---|---|---|
| 8,443,582 B1* | 5/2013 | Phillips | F01D 25/18 60/266 |
| 8,572,943 B1* | 11/2013 | Sheridan | F02C 7/06 60/39.08 |
| 9,714,610 B2* | 7/2017 | Snape | F02C 6/08 |
| 2005/0257528 A1* | 11/2005 | Dunbar, Jr. | F02K 3/10 60/761 |
| 2007/0245739 A1 | 10/2007 | Stretton et al. | |
| 2008/0028763 A1 | 2/2008 | Schwarz et al. | |
| 2009/0169359 A1 | 7/2009 | Murphy et al. | |
| 2009/0188232 A1 | 7/2009 | Suciu et al. | |
| 2009/0188234 A1* | 7/2009 | Suciu | F02C 7/14 60/262 |
| 2012/0272658 A1 | 11/2012 | Murphy | |

* cited by examiner

GEARED ARCHITECTURE TURBOFAN ENGINE THERMAL MANAGEMENT SYSTEM AND METHOD

The present disclosure claims priority to U.S. Provisional Patent Disclosure Ser. No. 61/792,395, filed Mar. 15, 2013.

BACKGROUND

The present disclosure relates to a geared architecture gas turbine engine and, more particularly, to a heat exchanger therefor.

Gas turbine engines, such as those which power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

Aero engine Thermal Management Systems (TMS) typically include heat exchangers and associated equipment which exchange engine heat with an airflow or fuel flow. The gas turbine engine architecture typically dictates TMS heat exchanger placement.

SUMMARY

A method of sizing a heat exchanger for a geared architecture gas turbine engine according to one disclosed non-limiting embodiment of the present disclosure includes sizing a minimum frontal area of at least one heat exchanger located in communication with a fan bypass airflow such that a ratio of waste heat area to horsepower generation characteristic area is between 1.6 to 17.5.

A further embodiment of the present disclosure includes, wherein the waste heat area is defined by the minimum frontal area of the HEX.

A further embodiment of any of the foregoing embodiments of the present disclosure includes, wherein the horsepower generation characteristic area is defined by an exit area of a high pressure compressor.

A further embodiment of any of the foregoing embodiments of the present disclosure includes, locating the at least one heat exchanger within a fan bypass airflow path such that the ratio of waste heat area to horsepower generation characteristic area is between 1.6 to 8.75.

A further embodiment of any of the foregoing embodiments of the present disclosure includes, locating the at least one heat exchanger with respect to a fan duct total pressure profile.

A method of sizing a heat exchanger for a geared architecture gas turbine engine according to another disclosed non-limiting embodiment of the present disclosure includes determining an efficiency of a geared architecture; determination a temperature requirement of the oil at a particular flight condition; determining a fan pressure ratio; and sizing a minimum frontal area of the at least one heat exchanger in response to the efficiency of the geared architecture, the temperature requirements of the oil at a particular flight condition, and the fan pressure ratio.

A further embodiment of any of the foregoing embodiments of the present disclosure includes, sizing the minimum frontal area of the at least one heat exchanger such that a ratio of waste heat area to horsepower generation characteristic area is between 1.6 to 17.5.

A further embodiment of any of the foregoing embodiments of the present disclosure includes, wherein the geared architecture provides an efficiency of at least 97.7%.

A further embodiment of any of the foregoing embodiments of the present disclosure includes, wherein the fan pressure ratio is less than 1.5.

A further embodiment of any of the foregoing embodiments of the present disclosure includes, wherein the at least one heat exchanger provides an efficiency of at least 50%.

A gas turbine engine according to another disclosed non-limiting embodiment of the present disclosure includes a geared architecture that provides an efficiency above 97.7%; a fan driven by the geared architecture to generate a fan bypass airflow; and at least one heat exchanger mounted in communication with the fan bypass airflow, a minimum frontal area of the at least one heat exchanger defines an area less than 420 in^2 (270967 mm^2).

A further embodiment of any of the foregoing embodiments of the present disclosure includes, wherein the geared architecture provides an efficiency of at least 97.7%.

A further embodiment of any of the foregoing embodiments of the present disclosure includes, wherein the fan provides a fan pressure ratio of less than 1.5.

A further embodiment of any of the foregoing embodiments of the present disclosure includes, wherein the at least one heat exchanger provides a cooling efficiency of at least 50%.

A further embodiment of any of the foregoing embodiments of the present disclosure includes, wherein the minimum frontal area of the at least one heat exchanger is sized such that a ratio of waste heat area to horsepower generation characteristic area is between 1.6 to 17.5.

A further embodiment of any of the foregoing embodiments of the present disclosure includes, wherein the geared architecture provides an efficiency of at least 97.7% and the at least one heat exchanger an provides efficiency of at least 50%.

A further embodiment of any of the foregoing embodiments of the present disclosure includes, wherein the fan provides a fan pressure ratio of less than 1.5 and the at least one heat exchanger provides an efficiency of at least 50%.

A further embodiment of any of the foregoing embodiments of the present disclosure includes, wherein the geared architecture provides an efficiency of at least 97.7%, the fan provides a fan pressure ratio of less than 1.5, and the at least one heat exchanger provides an efficiency of at least 50%.

A further embodiment of any of the foregoing embodiments of the present disclosure includes, wherein the fan bypass airflow provides a bypass ratio greater than 6.0.

A further embodiment of any of the foregoing embodiments of the present disclosure includes, wherein the at least one heat exchanger is operable to maintain an oil temperature below 325 F (163 C).

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
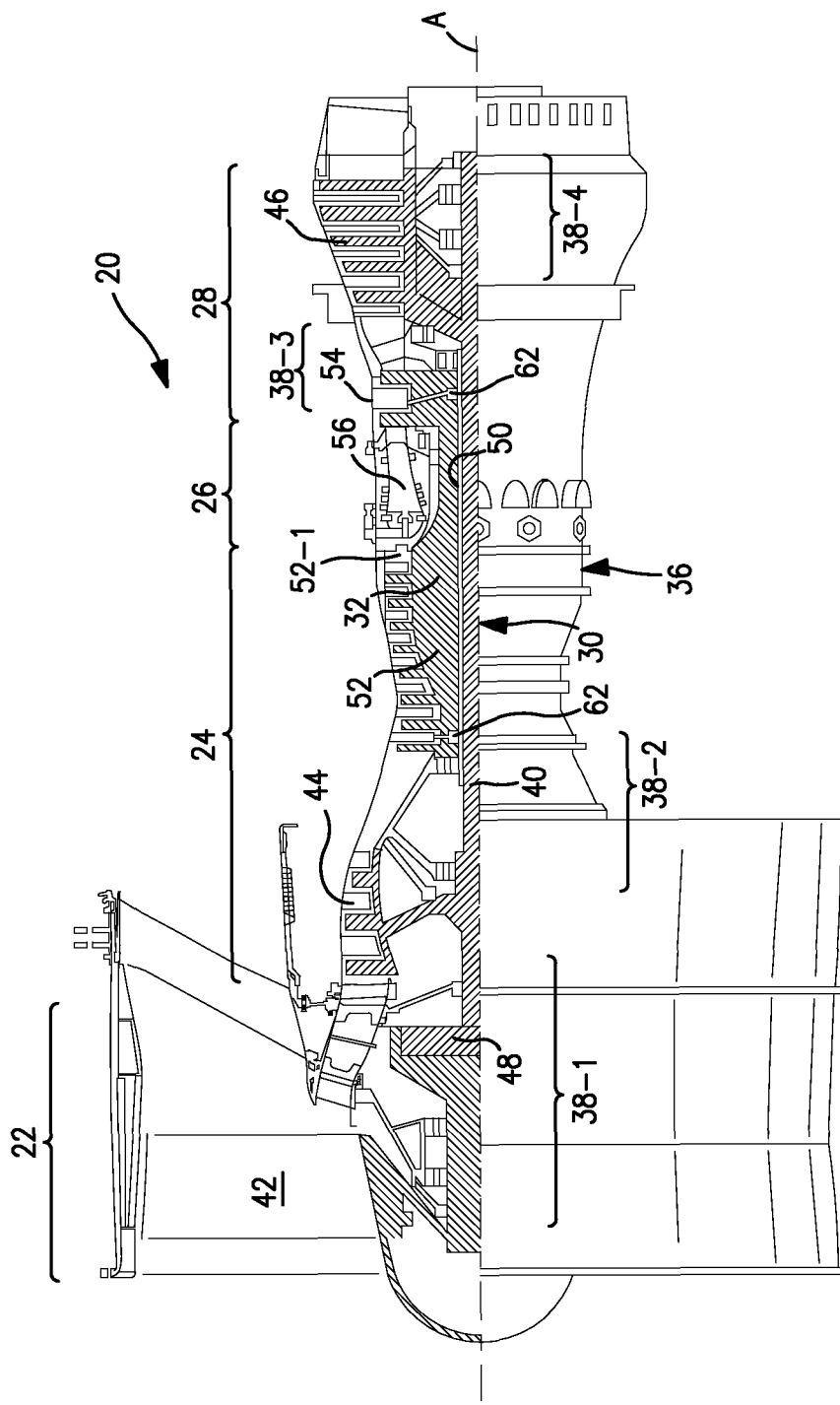
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a fan bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be appreciated that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine case assembly 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and the low pressure turbine 46. The turbines 54, 46 rotationally drive the respective low spool 30 and high spool 32 in response to the expansion.

In one non-limiting embodiment, the gas turbine engine 20 is a high-bypass geared architecture engine in which the bypass ratio is greater than six (6:1). The geared architecture 48 can include an epicyclic gear train, such as a planetary gear system, star gear system or other gear system. The example epicyclic gear train has a gear reduction ratio of greater than 2.3, and in another example is greater than 2.5. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than ten (10:1), the fan diameter is significantly larger than that of the low pressure compressor 44, and the low pressure turbine 46 has a pressure ratio that is greater than five (5:1). It should be appreciated, however, that the above parameters are only exemplary of one embodiment of a geared architecture engine and that the present disclosure is applicable to other gas turbine engines including direct drive turbofans.

The high bypass ratio results in a significant amount of thrust. The fan section 22 of the gas turbine engine 20 is designed for a particular flight condition—typically cruise at 0.8 Mach and 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$. The Low Corrected Fan Tip Speed according to one non-limiting embodiment of the example gas turbine engine 20 is less than 1150 fps (351 m/s). The Low Corrected Fan Tip Speed in another non-limiting embodiment of the example gas turbine engine 20 is less than 1200 fps (366 m/s).

Figure 2:
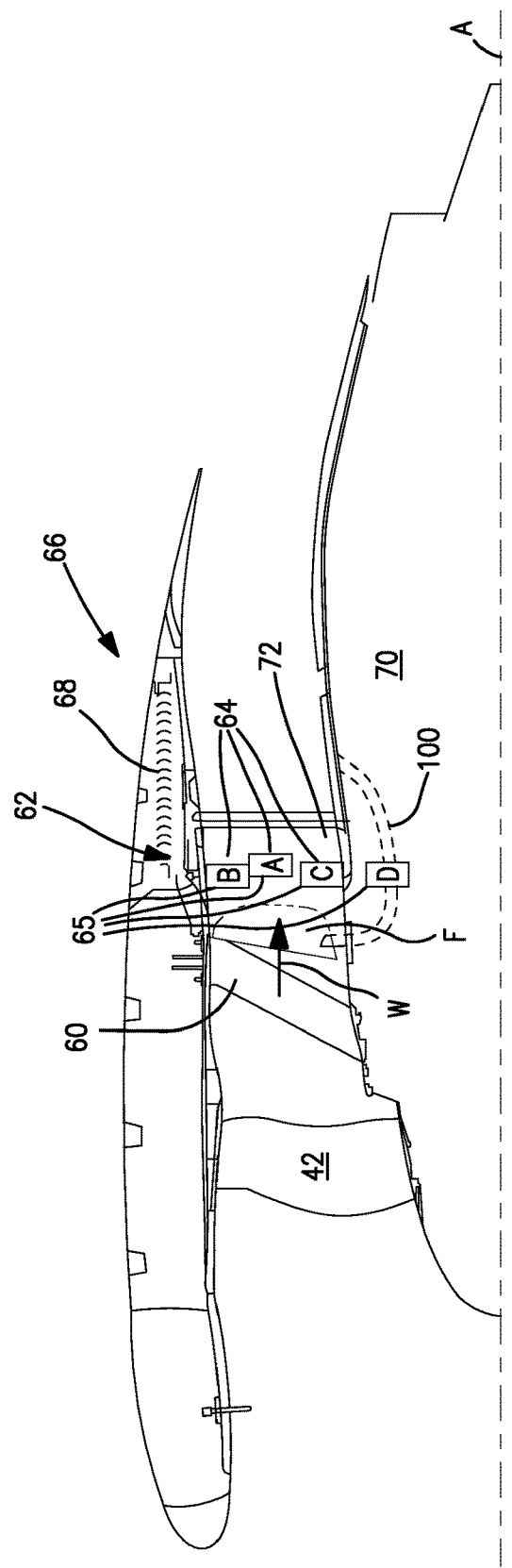
FIG. 2 is an expanded schematic cross-section of a fan airflow path of the gas turbine engine.

With reference to FIG. 2, the fan 42 drives air along a fan bypass flowpath W past a Fan Exit Guide Vane system 60. A thermal management system (TMS) 62 includes a heat exchanger (HEX) 64 that may be at least partially integrated into a nacelle assembly 66 such as a fan nacelle 68, a core nacelle 70, a bifurcation 72, the Fan Exit Guide Vane system 60 or any combination thereof but still considered as in communication with the fan bypass flowpath W as defined herein.

The HEX 64 in the disclosed non-limiting embodiment may be a "brick" type HEX 64 that, for example, may include an air-oil cooler or cooler array that services both the geared architecture 48 and/or engine oil circuits such as that which communicates with the bearing compartments. The HEX 64 in another disclosed non-limiting embodiment may be selectively moved into the fan bypass flowpath W when oil temperature or fuel temperature are cooler and less HEX frontal area and fan pressure loss are desired. The HEX 64 in still another disclosed non-limiting embodiment may be mounted within the nacelle assembly 66, the HEX 64 being positioned downstream of a scooped duct 100. Further, it should be appreciated that the minimum frontal area 65 of the HEX 64 may be distributed over a multiple of heat exchangers and that the example sizes provided herein are only utilized to depict relative sizing of the frontal area 65 of the HEX 64 and are not to be considered limiting.

Generally, HEX 64 location [A] is defined herein as the center or "heart" of the fan duct total pressure profile F across the fan bypass flowpath W while the HEX 64 location [B] is outboard of location [A] and the HEX 64 location [C] is located inboard of location [A]. Alternatively, the HEX 64 location [D] is a buried arrangement, here shown as within the core nacelle 70 with a scooped duct system 100 that communicates bypass airflow thereto. The HEX 64 at location [A] may be smaller than at location [B], and HEX 64 at location [B] may be smaller than a HEX 64 at location [C] because the total pressure from the fan 42 is greatest at a radial central location [A] and lowest at location [C]. That is, the fan duct total pressure profile F varies radially across the fan bypass flowpath B. The total pressure from the fan 42 and thus the HEX 64 efficiency varies at least in part by the efficiency of the geared architecture 48 and the Fan Pressure Ratio.

In addition, the efficiency of HEX 64 location [D] is also effected by location with respect to the scooped duct 100. It should be understood that other factors may also contribute to HEX efficiency, i.e., air temperature rise vs. maximum air temperature rise of the HEX—for example if oil is at a temperature of 300 degrees Fahrenheit (300 F) and fan airflow is at a temperature of 100 F (38 C), a 100% effective HEX would reduce the oil temperature from 300 F (149 C) to 100 F (38 C). That is, for example, fan duct pressure loss, system-level optimization of heat exchanger weight, the effect of fan duct losses on fuel burn, and other system-level effects may also be accounted for as a product of computerized numerical calculations and empirical data on, for example, a machine readable storage medium having stored thereon a computer program for sizing of the minimum frontal area 65 of the HEX 64 for a geared architecture gas turbine engine.

Figure 3:
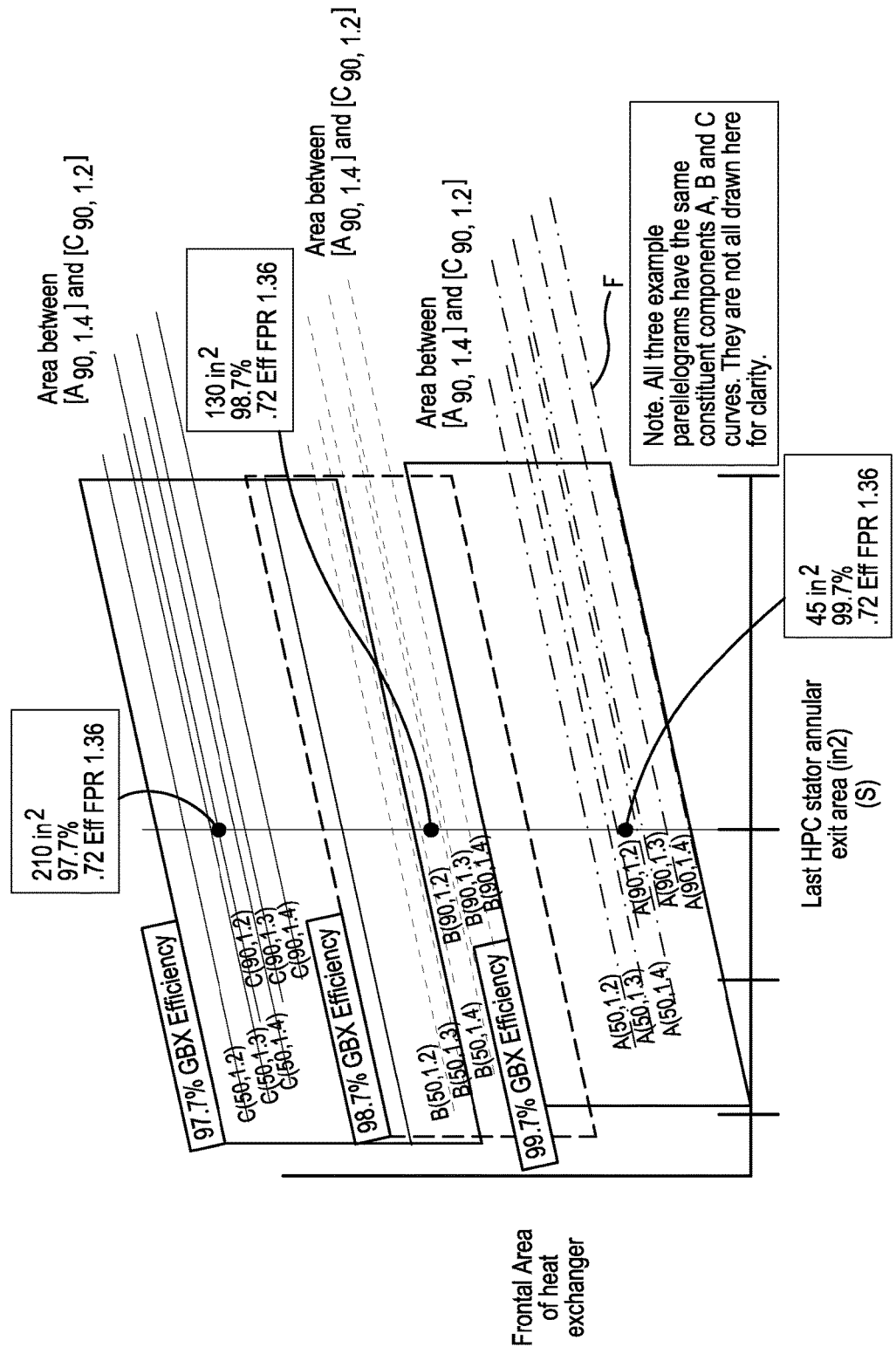
FIG. 3 is graphical representation of HEX sizing relationships for a geared architecture gas turbine engine.
Figure 4:
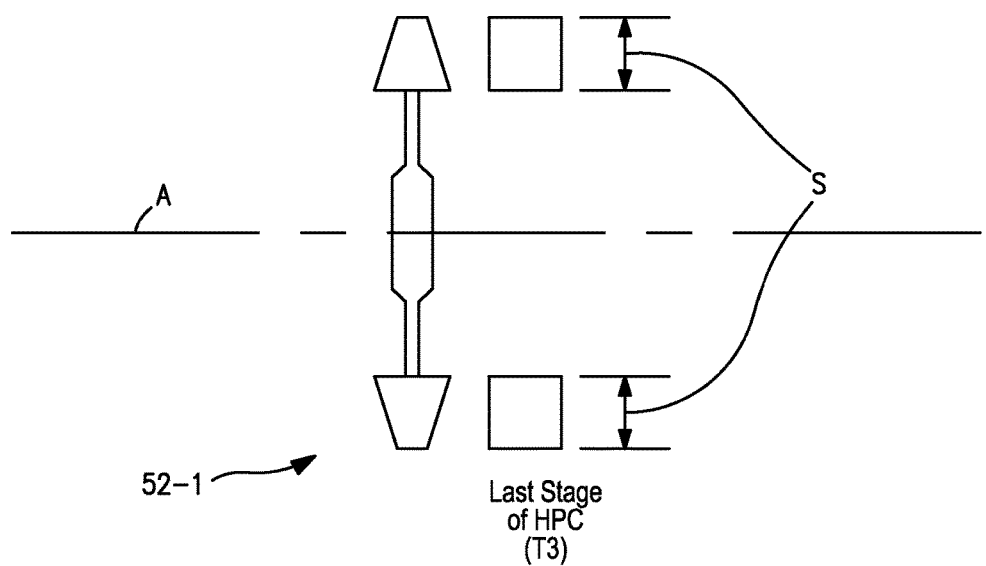
FIG. 4 is schematic representation of T3 aft of the last annular flow area in the plane of the trailing edge of the last blade annular flow area in the plane of the trailing edge of the last blade of the HPC.

With reference to FIG. 3, the position of the HEX 64 [A, B, or C; FIG. 2]; the efficiency of the HEX 64 [90% or 50%]; the Fan Pressure Ratio (FPR) [1.4; 1.3; or 1.2] and the efficiency of the geared architecture 48 [97.7%; 98.7%; or 99.7%] variables are plotted with respect to: a flat rated takeoff thrust takeoff at 86° F. (30° C.); an annular exit area of the final rotor stage in the HPC 52 (illustrated in FIG. 4) [X-axis]; and a HPC 52 exit corrected flow with respect to the frontal area 65 of the HEX 64 [Y-axis]. It should be appreciated that other relationships may alternatively be defined.

The fan pressure ratio (FPR) is representative of the total pressure available to the HEX 64. Only the minimum frontal area 65 of the HEX 64 need be considered and this minimum frontal area 65 of the HEX 64 may be normalized and given with respect to an annular flow area in the plane of the trailing edge of the final rotor stage 52-1 (FIG. 1) in the HPC 52 (FIG. 4) which is representative of the overall size of the engine 20. It should be appreciated that other relationships may be provided which result in equivalent HEX 64 sizing.

Positions $A90_{1.4;\ 1.3;\ 1.2}$ locates the HEX 64 at mid-stream of the fan airflow W with an example 90% HEX 64 efficiency where air exit temperature measured anywhere at the exit of the HEX 64 is approximately 90% of the oil input temperature. This is a relatively large HEX 64.

Positions $B90_{1.4;\ 1.3;\ 1.2}$ locate the HEX 64 at the outer diameter of the fan bypass flowpath W. Position C90 locates the HEX 64 at the inner diameter of the fan bypass flowpath W. Positions $A50_{1.4;\ 1.3;\ 1.2}$ sacrifice HEX 64 air temperature; for example, the efficiency is reduced to 50%, at the respective three locations A, B, C but the HEX is relatively smaller. At positions $C50_{1.4;\ 1.3;\ 1.2}$ the frontal area 65 of the HEX 64 is now much larger than positions $A90_{1.4;\ 1.3;\ 1.2}$; which describes the maximum and minimum frontal area 65 of the HEX 64 for an un-ducted HEX 64. At positions $C50_{1.4;\ 1.3;\ 1.2}$ the HEX 64 is relatively large because the fan pressure is extremely low and the air temperature rise is only 50% of the ideal temperature rise. Thus the minimum frontal area 65 of the HEX 64 $C50_{1.4;\ 1.3;\ 1.2}$ to the maximum frontal area of the HEX 64 at positions $A90_{1.4;\ 1.3;\ 1.2}$ is enveloped between these parameters.

The area between positions $A90_{1.4}$; and $C50_{1.2}$; is further affected by the efficiency of the geared architecture 48. A boundary F is when the geared architecture 48 efficiency is less than or equal to 97.7%; the fan pressure ratio (FPR) is, e.g., 1.4 (although it could be higher such as 1.50); and the HEX 64 is efficient e.g., provides 90% efficiency. It should be appreciated that all three example parallelograms have the same constituent components for positions A, B and C but are not all drawn here for clarity. That is, the most efficient 99.7% geared architecture is shown combined with the A positions while the least efficient 97.7% geared architecture is shown combined with the C positions to provide the greatest bounds. Furthermore, position $A90_{1.4}$ with 99.7% efficiency while position $C50_{1.2}$ with 97.7% efficiency provide an example relative practical range of minimum frontal area 65 of the HEX 64 as sized with respect to the fan bypass airflow. The disclosed relationship facilitates determination of minimum frontal area 65 of the HEX 64 for a geared architecture gas turbine engine. For example, 24,000 pounds of thrust at Sea Level Takeoff, flat rated to an 86° F. day, with a 97.7% efficiency geared architecture 48 may be plotted so that the HEX 64 may then be sized to a particular altitude and fuel temperature condition.

Figure 5:
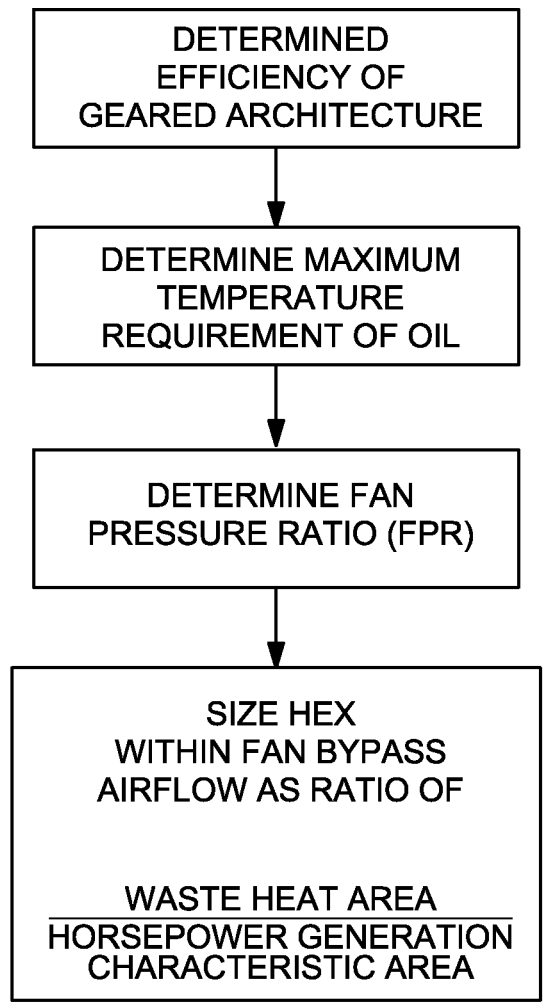
FIG. 5 is a flow chart illustrating sizing boundaries of a heat exchanger in communication with the fan bypass airflow for a geared architecture gas turbine engine.

With reference to FIGS. 3 and 5, initially, one boundary condition to size the minimum frontal area 65 (of at least one HEX 64 mounted in communication with a fan bypass airflow) is determining the efficiency of the geared architecture 48, here shown as three general examples of geared architecture efficiency: high, e.g., the 99.7% "A" plane; medium, e.g., the 98.7% "B" plane; and low, e.g., the 97.7% "C" plane. This efficiency of the geared architecture 48 is herein described as the starting point and primary variable that will affect the minimum frontal area 65 required as shown on the Y-axis of FIG. 3.

Another boundary condition is the determination of the temperature requirement of the oil, for example, a maximum oil temperature of 325° F. (163° C.) leaving the engine. Accordingly, for the same efficiency of the geared architecture 48, a higher allowable temperature will result in a relatively smaller minimum frontal area 65 of the HEX 64 while a lower allowable temperature will result in a relatively larger minimum frontal area 65. It should be appreciated that other factors such as other internal fuel-oil heat exchangers may be involved and are accounted for in the primary variable discussed, i.e, the maximum oil temperature is the resultant temperature through the system. Thus, all of the factors in this paragraph are depicted in FIG. 3, as the area between positions $A90_{1.4}$ and $C50_{1.2}$.

Another boundary condition involved in the design of the engine is the fan pressure ratio at the engine thrust required by the aircraft. Realistically, as the designer decreases engine fan pressure ratio to improve fuel burn, the engine bypass ratio increases until the engine weight and drag increase such that the fan duct size causes the fuel burn to reach a minimum. The fan pressure ratio is that which drives the mass flow into the HEX 64 so that as fan pressure drops, the minimum frontal area 65 of the HEX 64 will be relatively larger. This is depicted in FIG. 3 as the upward sloping lines of increasing area with increasing thrust but also increasing area at the same thrust if one is comparing a 1.4 fan pressure to a 1.2 fan pressure.

An example calculation is based around an engine with 33,000 lbs of static thrust at sea level on an 86° F. day and a 1.36 fan pressure ratio at 35K feet altitude. Takeoff operations provide significant fuel flow cooling of the oil via a fuel-oil HEX (not shown), so takeoff operations are not the air-oil HEX 64 sizing point. The minimum sizing point is for flight operations, which, in this example, are with 17,424 pounds of thrust. Notably, thrust decreases at altitude due to reduced air density. At this example sizing condition, the 99.7% efficiency geared architecture 48, with a target heat exchanger efficiency of 72% will have a minimum frontal area 65 of 45 in^2 (29032 mm^2) to arrive at an oil temperature maximum of 325° F. maximum. For the same example, a 98.7% efficiency geared architecture 48, would require a minimum frontal area 65 of 130 in^2 (83870 mm^2) while a 97.7% efficiency geared architecture 48 would require a frontal area 65 of 210 in^2 (135484 mm^2) to provide the desired maximum oil temperature of 325° F. A buried architecture minimum frontal area 65, e.g., location [D] (FIG. 2) would be 420 in^2 (270967 mm^2).

The combination of these and other variables may also be satisfactorily normalized and compared to an exit area S of the final rotor stage 52-1 (FIG. 1) in the HPC 52 (FIG. 4) as all the airflow that is mixed with, and ultimately exits this engine section may be considered the present state of the art for maximum combustor exit temperature that is viable for acceptable engine durability and economics. That is, the exit area S is a valuable figure of merit to characterize the horsepower that can be produced by the engine 20 and the minimum frontal area 65 of the HEX 64 can be compared thereto, since it represents the handling of lost energy.

For one example, the minimum frontal area 65 range of the HEX 64 required to cool the oil to a desired temperature can range from 45-420 in^2 as described above and the exit area S of the final rotor stage 52-1 is 28 in^2. In one disclosed non-limiting embodiment, the ratio of "waste heat area", i.e., the frontal area 65 to "horsepower generation characteristic area" i.e., the exit area S of the last annular flow area in the plane of the trailing edge of the final rotor stage 52-1 ranges from 1.6 to 8.75 and is relatively linear for all engines using air-oil heat exchangers that see fan total pressure directly as illustrated in locations [A], [B], [C] of FIG. 2. In another disclosed non-limiting embodiment, heat exchangers that are buried inside of parasitic ducts adjacent to the fan bypass flowpath W with scoops within the fan bypass flowpath W that capture fan total pressure, e.g., location [D], duct losses, valves etc., result in a "waste heat area" to "horsepower generation characteristic area" of 3.2 to 17.5. That is, the buried HEX 64 arrangement would have a "waste heat area" to "horsepower generation characteristic area" that is essentially double that of a heat exchanger location [A] within the fan bypass flowpath W, i.e., 420 in^2.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of sizing a heat exchanger for a geared architecture gas turbine engine comprising:
   sizing a minimum frontal area of at least one heat exchanger located in communication with a fan bypass airflow of the geared architecture gas turbine engine, the geared architecture provides an efficiency of at least 97.7%, such that a ratio of waste heat area to horsepower generation characteristic area is between 1.6 to 17.5, the waste heat area defined by the frontal area of the at least one heat exchanger, wherein the horsepower generation characteristic area is defined by an exit area of a high pressure compressor of the geared architecture gas turbine engine.

2. The method as recited in claim 1, further comprising locating the at least one heat exchanger within a fan bypass airflow path such that the ratio of waste heat area to horsepower generation characteristic area is between 1.6 to 8.75.

3. The method as recited in claim 1, further comprising locating the at least one heat exchanger with respect to a fan duct total pressure profile.

4. A geared architecture gas turbine engine comprising:
   a geared architecture that provides an efficiency of at least 97.7%;
   a fan driven by the geared architecture of the gas turbine engine to generate a fan bypass airflow; and
   at least one heat exchanger mounted in communication with the fan bypass airflow, a minimum frontal area of the at least one heat exchanger defines an area less than 420 in$^2$ (270967 mm$^2$) and greater than 0 in$^2$, the minimum frontal area of the at least one heat exchanger is sized such that a ratio of waste heat area to horsepower generation characteristic area is between 1.6 to 17.5.

5. The gas turbine engine as recited in claim 4, wherein the fan provides a fan pressure ratio of less than 1.5.

6. The gas turbine engine as recited in claim 4, wherein the at least one heat exchanger provides a cooling efficiency of at least 50%.

7. The gas turbine engine as recited in claim 4, wherein the geared architecture provides an efficiency of at least 97.7% and the at least one heat exchanger provides an efficiency of at least 50%.

8. The gas turbine engine as recited in claim 4, wherein the fan provides a fan pressure ratio of less than 1.5 and the at least one heat exchanger provides an efficiency of at least 50%.

9. The gas turbine engine as recited in claim 4, wherein the fan bypass airflow provides a bypass ratio greater than 6.0.

10. The gas turbine engine as recited in claim 4, wherein the at least one heat exchanger is operable to maintain an oil temperature below 325 F (163 C).

11. The gas turbine engine as recited in claim 4, wherein the at least one heat exchanger is located at an outer diameter of the fan bypass airflow.

12. The gas turbine engine as recited in claim 4, wherein the at least one heat exchanger is located at mid-stream of the fan bypass airflow.

13. The gas turbine engine as recited in claim 4, wherein the at least one heat exchanger is located at an inner diameter of the fan bypass airflow.

\* \* \* \* \*